United States Patent
Teramoto et al.

(10) Patent No.: US 7,657,760 B2
(45) Date of Patent: Feb. 2, 2010

(54) METHOD FOR SHARING ENCRYPTED DATA REGION AMONG PROCESSES IN TAMPER RESISTANT PROCESSOR

(75) Inventors: Keiichi Teramoto, Tokyo (JP); Mikio Hashimoto, Kanagawa (JP); Kenji Shirakawa, Kanagawa (JP); Satoshi Ozaki, Kanagawa (JP); Kensaku Fujimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 185 days.

(21) Appl. No.: 11/538,225

(22) Filed: Oct. 3, 2006

(65) Prior Publication Data

US 2008/0046763 A1 Feb. 21, 2008

Related U.S. Application Data

(62) Division of application No. 10/028,794, filed on Dec. 28, 2001, now abandoned.

(30) Foreign Application Priority Data

Dec. 28, 2000 (JP) .............................. 2000-402672

(51) Int. Cl.
*G06F 12/14* (2006.01)
*H04L 9/08* (2006.01)

(52) U.S. Cl. ........................ 713/194; 713/190; 380/284

(58) Field of Classification Search ................ 713/194, 713/190; 380/284
See application file for complete search history.

(56) References Cited

U.S. PATENT DOCUMENTS

| 4,847,902 A * | 7/1989 | Hampson .................... 713/190 |
| 5,123,045 A | 6/1992 | Ostrovsky et al. |
| 5,224,166 A | 6/1993 | Hartman, Jr. |
| 5,666,411 A * | 9/1997 | McCarty ...................... 705/51 |
| 5,781,633 A * | 7/1998 | Tribble et al. ............... 713/167 |
| 5,805,706 A | 9/1998 | Davis |
| 5,825,878 A | 10/1998 | Takahashi et al. |
| 5,937,063 A | 8/1999 | Davis |
| 5,940,510 A * | 8/1999 | Curry et al. .................. 705/65 |
| 6,003,117 A | 12/1999 | Buer et al. |
| 6,009,543 A * | 12/1999 | Shavit ........................ 712/200 |

(Continued)

FOREIGN PATENT DOCUMENTS

EP 0 816 969 1/1998

(Continued)

OTHER PUBLICATIONS

David Aucsmith, et al., "Tamper Resistant Software: An Implementation", Proceedings of the 1996 Intel Software Developers' Conference, pp. 1-10.

*Primary Examiner*—Michael Pyzocha
(74) *Attorney, Agent, or Firm*—Oblon, Spivak, McClelland, Maier & Neustadt, L.L.P.

(57) ABSTRACT

In the method for sharing encrypted data region among two or more processes on a tamper resistant processor, one process creates the encrypted data region to be shared according to the common key generated as a result of the safe key exchange, and the other process maps that region to its own address space or process space. The address information of the shared encrypted data region and the common key of each process are set in relation in the encrypted attribute register inside the tamper resistant processor, so that it is possible to share the encrypted data region safely.

10 Claims, 8 Drawing Sheets

U.S. PATENT DOCUMENTS

| | | | | |
|---|---|---|---|---|
| 6,088,800 | A * | 7/2000 | Jones et al. | 713/189 |
| 6,249,866 | B1 * | 6/2001 | Brundrett et al. | 713/165 |
| 6,253,322 | B1 * | 6/2001 | Susaki et al. | 713/170 |
| 6,307,936 | B1 * | 10/2001 | Ober et al. | 380/30 |
| 6,370,250 | B1 * | 4/2002 | Stein | 380/281 |
| 6,408,388 | B1 * | 6/2002 | Fischer | 713/176 |
| 6,651,171 | B1 * | 11/2003 | England et al. | 713/193 |
| 6,684,330 | B1 * | 1/2004 | Wack et al. | 713/162 |
| 6,704,871 | B1 * | 3/2004 | Kaplan et al. | 713/192 |
| 6,938,162 | B1 | 8/2005 | Nagai et al. | |
| 6,993,654 | B2 * | 1/2006 | Seki et al. | 713/172 |

FOREIGN PATENT DOCUMENTS

| | | |
|---|---|---|
| JP | 11-282667 | 10/1999 |
| WO | WO 00/45262 | 8/2000 |

* cited by examiner

METHOD FOR SHARING ENCRYPTED DATA REGION AMONG PROCESSES IN TAMPER RESISTANT PROCESSOR

CROSS REFERENCE TO RELATED APPLICATIONS

This application is a divisional application of U.S. patent application Ser. No. 10/028,794, filed Dec. 28, 2001, which is based upon and claims the benefit of priority from Japanese Patent Application No. 2000-402672, filed Dec. 28, 2000, the entire contents of each of which are incorporated herein by reference.

BACKGROUND OF THE INVENTION

1. Field of the Invention

The present invention relates to a microprocessor having a function for assisting a multi-task program execution environment, and more particularly, to a micro-processor having a function for encrypting/decrypting programs and data which is capable of sharing hidden programs or hidden data among a plurality of processes safely.

2. Description of the Related Art

In recent years, the performance of a microprocessor has improved considerably such that the microprocessor is capable of realizing reproduction and editing of video images and audio sounds, in addition to the conventional functions such as computations and graphics. By implementing such a microprocessor in a system designed for end-user (which will be referred to as PC hereafter), the users can enjoy various video images and audio sounds on monitors. Also, by combing the function for reproducing video images and audio sounds with the computational power of the PC, the applicability to games or the like can be improved. Such a microprocessor is not designed for any specific hardware and can be implemented in a variety of hardwares so that there is an advantage that the users who already possess PCs can enjoy reproduction and editing of video images and audio sounds inexpensively.

In the case of handling video images and audio sounds on PCs, there arises a problem of a protection of the copyright of original images or music. In particular, in order to prevent alteration or illegal copying of a software for handling image data or music data on the PC, a technique called tamper resistant software technique has been used (see David Aucsmith et al., "Tamper Resistant Software: An Implementation", Proceedings of the 1996 Intel Software Developer's Conference). The tamper resistant software technique is a technique for protecting know-how or the like contained in the software from analysis and preventing analysis and alternation of the software by encrypting the software.

However, the tamper resistant software technique is basically a technique which makes analysis using tools such as de-assembler or debugger difficult by encrypting a portion of the program that requires protection before the execution of the program starts, decrypting that portion immediately before executing that portion and encrypting that portion again immediately after the execution of that portion is completed. Consequently, as along as the program is executable by a processor, it is always possible to analyze the program by carrying out the analysis step by step starting from the start of the program. This fact has been an obstacle for providing copyright protected contents or sophisticated information services through the PC or applying programs containing know-how of an enterprise or individual to the PC.

In addition, as a problem on the hardware side, the PC is an open platform so that there is also a possibility of an attack by altering the operating system (OS) which is intended to be a basis of the system's software configuration. Namely, a skilled and malicious user can alter the OS of his own PC to carry out operations to invalidate or analyze the copyright protection mechanisms incorporated in application programs by utilizing privileges given to the OS, instead of carrying out the normal operations of the OS.

The current OS realizes the multi-task environment for seemingly processing a plurality of tasks in parallel by utilizing a privileged operation function with respect to a memory and an execution control function provided in CPU. Namely, the OS carries out an allocation of resources necessary for the execution of a program, i.e., an allocation of a CPU time to the execution of the program and an allocation of a memory space necessary for the execution of the program, and controls accesses to devices, network and application QoS that are under the control of the computer. For this purpose, the OS has the following two privileges.

The first privilege is that the OS can interrupt or restart an application program at arbitrary timing in order to carry out the CPU time allocation.

The second privilege is that the OS can move a content of a memory space allocated to an application program to a memory of a different hierarchical level at arbitrary timing, such that the OS can provide a flat memory space to the application by concealing normally hierarchical memory systems with different access speeds and capacities from the application.

Using these two privileges, the OS can interrupt an execution state of the application and take a snap shot of it at arbitrary timing, and restart it after making a copy of it or rewriting it. This function can also be used as a tool for analyzing secrets hidden in the application.

In order to prevent an analysis of the application on a computer, there are several known techniques for encrypting programs or data (Hampson, U.S. Pat. No. 4,847,902; Hartman, U.S. Pat. No. 5,224,166; Davis, U.S. Pat. No. 5,806,706; Takahashi et al., U.S. Pat. No. 5,825,878; Buer et al., U.S. Pat. No. 6,003,117; Japanese Patent Application Laid Open No. 11-282667 (1999), for example). The encrypted execution codes can be decrypted only by the microprocessor which knows the secret key. The decrypted state is allowed to exist only inside the microprocessor and no process or OS other than the executed process is allowed to carry out the decryption.

However, these known techniques do not account for the protection of the program operation and the data secrecy from the above described privileged operations of the OS. Consequently, the system employing the conventional encryption technique has a drawback in that the analysis of the program becomes possible by utilizing a privilege of the OS called a context switching, without decrypting the encrypted execution codes.

The context switching is carried out to switch some processes by the OS when the execution of the program is stopped by the interruption or when the program voluntarily calls up a software interruption command due to the system call up. Namely, for the purpose of the execution of the other program, the OS stores an execution state (which will be referred to as a context information hereafter) of the program indicating a set of register values at that point into a memory, and restores the context information of another program stored in the memory in advance into the registers. The context switching is an indispensable function in order to operate a plurality of programs in parallel. The OS can read the register values at a time of the context switching, so that it is possible to guess most of the operations made by the programs, according to how the execution state of that program has changed.

Apart from the interruption of the execution and the analysis of the program, the OS can also arbitrarily rewrite the register information that has been moved to the memory. The OS can store arbitrary state of the application so that it is possible to analyze the operation of the program by rewriting the register values and operating the program repeatedly.

In view of these problems, the present inventors have proposed a technique for automatically encrypting a part or whole of the context information in the registers within the microprocessor and saving it to a memory external of the processor at a time of the context switching, as disclosed in the commonly assigned co-pending U.S. patent application Ser. No. 09/781,284. Using this technique, the attacks by the OS at a time of the context switching can be prevented.

On the other hand, there is also a proposition of a technique in which each one of a plurality of applications and program providers maintains secrets independently from the OS. In U.S. Pat. No. 5,123,045, Ostrovsky et al. disclose a system that presupposes the use of sub-processors having a unique secret key for each application, in which the operation of the program cannot be guessed from the access pattern by which these sub-processors are accessing programs placed on a main memory. This system is based on a mechanism for carrying out random memory accesses by converting the instruction system for carrying out operations with respect to the memory into another instruction system different from that.

However, this technique requires different sub-processors for different applications so that it requires a high cost, and the implementation and fast realization of the compiler and processor hardware for processing such instruction system are quite different from those of the currently used processors, so that the realization of this system is expected to be very difficult at present. Also, in this type of processor, it becomes difficult to comprehend correspondences among the data contents and the operations even when the data and the operations of the actually operated codes are observed and traced so that the debugging of the program becomes very difficult, and therefore this technique has many practical problems, compared with the other conventional techniques described above in which the program codes and the data are simply encrypted, such as those of U.S. Pat. No. 5,224,166 and Japanese Patent Application Laid Open No. 11-282667.

The development of techniques for protecting encrypted programs and their processing target data is still in progress currently, but the current development is basically focused on the prevention of eavesdropping of programs and data from the other process by invalidating the analysis and tracing of the executed process.

On the other hand, there are demands for mutually sharing programs and data even in the encrypted state among properly permitted processes (programs). Namely, there are demands for sharing the encrypted programs and hidden data among processes in a similar manner as using an existing non-encrypted library or an inter-process shared memory provided by the OS. In order to share the encrypted programs or data among different processes, how to share the key information safely among proper processes can be a problem.

In the processor in which the decrypted state of the encrypted program or data is allowed only within the processor, when it is desired to share the encrypted memory region created by some process with the other process, the meaningful data sharing cannot be realized by simply utilizing the memory sharing mechanism provided by the OS, because the other process that requests the sharing of the encrypted memory region does not know the key necessary for this region.

The read/write of the encrypted memory region is carried out by using the key corresponding to this memory region. The key is maintained secretly within the processor. For this reason, if the same key can be shared within the processor by the other process as well, the meaningful read/write becomes possible. Here, however, it is necessary to carry out this key sharing safely between two processes.

The safe key sharing between processes which know the key in advance can be realized by embedding the key in the encrypted state within the program. However, if the key cannot be embedded in advance or if the key is to be shared between processes (programs) to which the key should not be notified in advance, there is a need to establish a safe key exchange sequence between processes.

Up to now, there are many techniques aimed at establishing a safe key exchange sequence via a network in conjunction with the development of the public key cryptosystem. The key information to be exchanged on the network itself can be eavesdropped, but the attacks are difficult unless the secret key maintained within each computer is known. In the case of the key exchange via a network, the temporary data to be used for the key exchange or key calculation within the computer are handled in the plaintext form under the presumption that the temporary data cannot be leaked to the network or cannot be eavesdropped from the network.

However, the present invention is directed to the case where there is a need to carry out the key exchange between processes within the computer, separately from the key exchange sequence via a network, and it is presupposed that the temporary data to be used for the key exchange or key calculation are also to be placed within the computer.

BRIEF SUMMARY OF THE INVENTION

It is therefore an object of the present invention to provide a method for sharing the encrypted data region safely between two processes in a processor (tamper resistant processor) which is capable of protecting the secret of the executed process from the analysis and the intentional alteration.

It is another object of the present invention to provide a method for sharing the encrypted data region among three or more processes by utilizing safe communication paths.

According to one aspect of the present invention there is provided a method for sharing encrypted data region among two or more processes on a tamper resistant processor having a program and data encryption/decryption function, the method comprising: giving a common key to each one of the two or more processes in advance; shifting an execution mode of the tamper resistant processor to an encrypted instruction execution mode; operating an owner process among the two or more processes to generate a shared encrypted data region valid only with respect to the common key in a process space of the owner process; operating each client process other than the owner process among the two or more processes to map the shared encrypted data region generated by the owner process to a process space of the each client process; and setting address information of the shared encrypted data region for each process among the two or more processes in relation to the common key in an encrypted attribute register inside the tamper resistant processor.

According to another aspect of the present invention there is provided a method for sharing encrypted data region among two processes on a tamper resistant processor having a program and data encryption/decryption function, the method comprising: (a) shifting an execution mode of the tamper resistant processor to an encrypted instruction execution mode; (b) operating each process among the two processes to generate a hidden data region of the each process in a process space of the each process; (c) operating the two processes to generate mutually different key pairs to be used in a key exchange and carry out the key exchange between the two processes; (d) operating the each process to generate a common key according to the key exchange; (e) generating a shared encrypted data region to be shared by the two processes which is valid only with respect to the common key; and (f) storing the common key and data used in a course of the key exchange in the hidden data region of the each process.

According to another aspect of the present invention there is provided a method for sharing encrypted data region among three or more processes on a tamper resistant processor having a program and data encryption/decryption function, the method comprising: (a) shifting an execution mode of the tamper resistant processor to an encrypted instruction execution mode; (b) operating an owner process among the three or more processes to generate a shared encrypted data region to be shared among the three or more processes; (c) operating the owner process to specify a common key for the shared encrypted data region; (d) operating the three or more processes to generate an encrypted key notification region for each client process other than the owner process among the three or more processes, the encrypted key notification region being shared only between the owner process and the each client process; (e) operating the owner process to notify the common key to the each client process through the encrypted key notification region for the each client process; (f) operating the each client process to map the shared encrypted data region generated by the owner process to a process space of the each client process; and (g) setting address information of the shared encrypted data region for each process among the three or more processes in relation to the common key in an encrypted attribute register inside the tamper resistant processor.

According to another aspect of the present invention there is provided a tamper resistant processor having a program and data encryption/decryption function and a memory that stores computer readable program codes for sharing encrypted data region among two or more processes, the computer readable program codes include: a first computer readable program code for causing said computer to give a common key to each one of the two or more processes in advance; a second computer readable program code for causing said computer to shift an execution mode of the tamper resistant processor to an encrypted instruction execution mode; a third computer readable program code for causing said computer to operate an owner process among the two or more processes to generate a shared encrypted data region valid only with respect to the common key in a process space of the owner process; a fourth computer readable program code for causing said computer to operate each client process other than the owner process among the two or more processes to map the shared encrypted data region generated by the owner process to a process space of the each client process; and a fifth computer readable program code for causing said computer to set address information of the shared encrypted data region for each process among the two or more processes in relation to the common key in an encrypted attribute register inside the tamper resistant processor.

According to another aspect of the present invention there is provided a tamper resistant processor having a program and data encryption/decryption function and a memory that stores computer readable program codes for sharing encrypted data region among two processes, the computer readable program codes include: a first computer readable program code for causing said computer to shift an execution mode of the tamper resistant processor to an encrypted instruction execution mode; a second computer readable program code for causing said computer to operate each process among the two processes to generate a hidden data region of the each process in a process space of the each process; a third computer readable program code for causing said computer to operate the two processes to generate mutually different key pairs to be used in a key exchange and carry out the key exchange between the two processes; a fourth computer readable program code for causing said computer to operate the each process to generate a common key according to the key exchange; a fifth computer readable program code for causing said computer to generate a shared encrypted data region to be shared by the two processes which is valid only with respect to the common key; and a sixth computer readable program code for causing said computer to store the common key and data used in a course of the key exchange in the hidden data region of the each process.

According to another aspect of the present invention there is provided a tamper resistant processor a having program and data encryption/decryption function and a memory that stores computer readable program codes for sharing encrypted data region among three or more processes, the computer readable program codes include: a first computer readable program code for causing said computer to shift an execution mode of the tamper resistant processor to an encrypted instruction execution mode; a second computer readable program code for causing said computer to operate an owner process among the three or more processes to generate a shared encrypted data region to be shared among the three or more processes; a third computer readable program code for causing said computer to operate the owner process to specify a common key for the shared encrypted data region; a fourth computer readable program code for causing said computer to operate the three or more processes to generate an encrypted key notification region for each client process other than the owner process among the three or more processes, the encrypted key notification region being shared only between the owner process and the each client process; a fifth computer readable program code for causing said computer to operate the owner process to notify the common key to the each client process through the encrypted key notification region for the each client process; a sixth computer readable program code for causing said computer to operate the each client process to map the shared encrypted data region generated by the owner process to a process space of the each client process; and a seventh computer readable program code for causing said computer to set address information of the shared encrypted data region for each process among the three or more processes in relation to the common key in an encrypted attribute register inside the tamper resistant processor.

Other features and advantages of the present invention will become apparent from the following description taken in conjunction with the accompanying drawings.

DETAILED DESCRIPTION OF THE INVENTION

Figure 1:
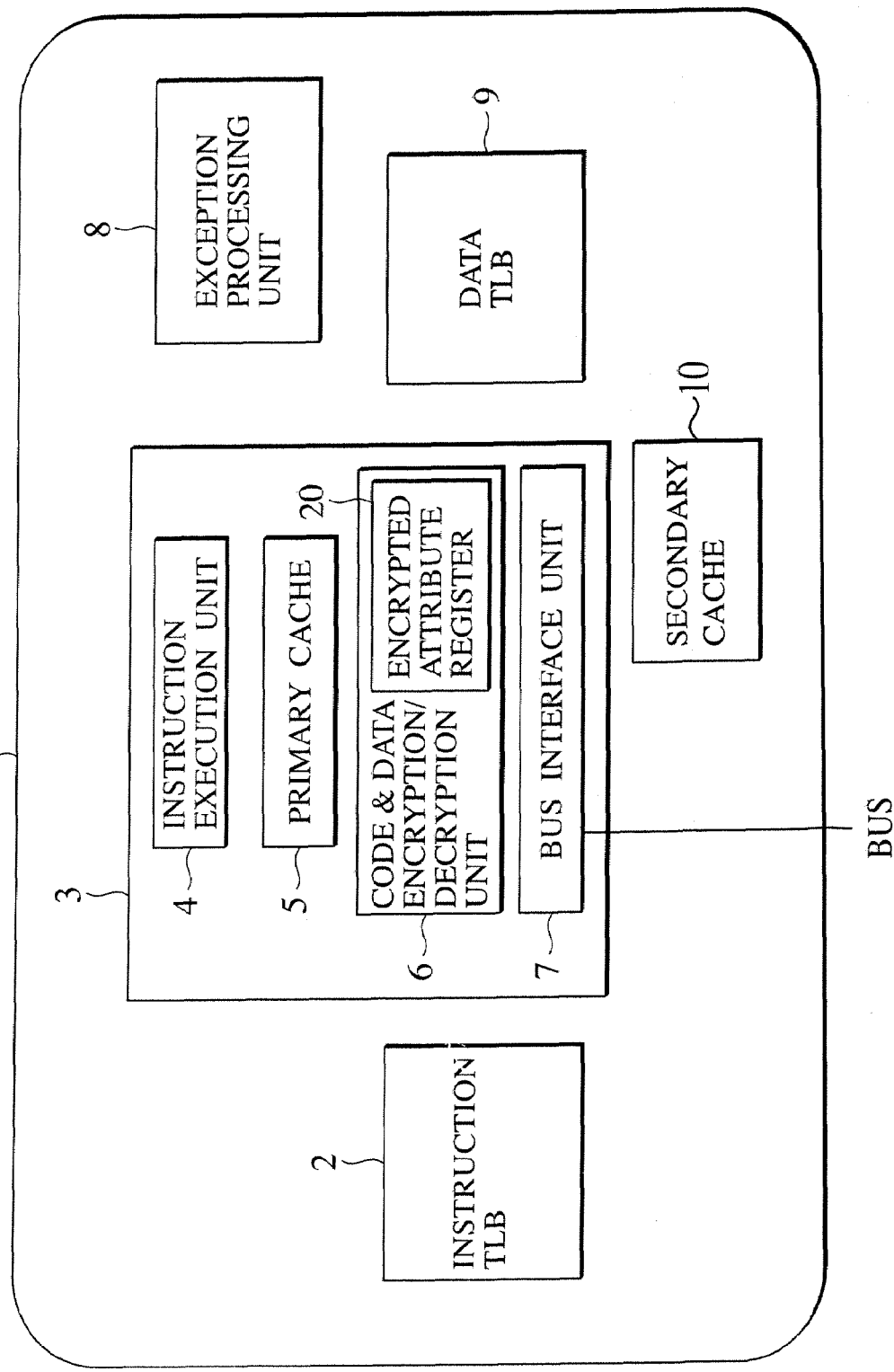
FIG. 1 is a block diagram showing an exemplary configuration of a microprocessor presupposed in the method for sharing encrypted data region among processes according to the present invention.

Referring now to FIG. 1 to FIG. 8, embodiments of a method for sharing encrypted data region among processes according to the present invention will be described in detail.

First, the major features of the present invention will be briefly summarized.

The present invention presupposes the use of a tamper resistant microprocessor with an execution environment in which the execution codes of the encrypted program and the encrypted data processed by that program can be utilized only by proper execution processes.

In order to realize the method for sharing the encrypted data region between two processes on the tamper resistant microprocessor, a method for giving a common key to the two processes in advance and a method for generating a common key at a time of creating the encrypted data region to be shared and notifying the generated common key to the sharing partner process are available.

In the former method, the common key is given in advance to each process involved in the inter-process sharing, so that this method can be extended to the sharing of the encrypted data region among arbitrary number of processes. This method contains a step of giving the common key in advance to each one of two or more processes for sharing the encrypted data region on a processor having a program and data encryption/decryption function, and a step of shifting the execution mode of the processor to the encrypted instruction execution mode. Then, the first process among the two or more processes generates a shared encrypted region valid only for the given common key in its own process space and the other process maps the shared encrypted region generated by the first process to its own process space. In addition, an address of the shared encrypted region of each process is registered in an encrypted attribute register inside the processor in relation to the respectively given common key.

In the latter method, when the key information for the encrypted data region to be shared between two processes cannot be shared in advance by these two processes, a process which created the encrypted data region generates the common key and notifies this common key to the other process at each occasion of creating the encrypted data region. In this method, the execution mode of the processor is shifted to the encrypted instruction execution mode on a processor having a program and data encryption/decryption function first.

Then, each process generates its own hidden data region in its own process space. An address of each hidden data region is registered in the encrypted attribute register inside the processor in relation to a respectively corresponding key for that hidden data region. In addition, each process generates a key pair to be used for the key exchange which is different for different processes, and the key exchange is carried out between the two processes. Each process generates the common key according to the key exchange. Then, a shared encrypted region to be shared between the two processes which is valid only for this common key is generated. Finally, the common key and the data used in a course of the key exchange are stored in the hidden data region of each process.

The shared encrypted region is generated in such a manner that one process (owner process) among the two processes generates the shared encrypted region in its own process space, and the other process (client process) that requests the sharing maps this shared encrypted region to its own process space. In this case, each process registers an address of the shared encrypted region in the encrypted attribute register inside the processor in relation to the respective common key.

In this method, the common key is generated in a secret state, and the data used for it as well as the common key itself are stored in the hidden data region, so that the shared encrypted region cannot be accessed by any processes other than the two processes which know the common key or even by the OS.

In the case where it is desired to further improve the reliability of the encrypted data region sharing, the key exchange between the two processes is carried out according to the verification of the message signature. More specifically, each process generates a random number and requests the authentication to the other process by sending this random number and a certificate produced by a public organization. When the authentication is successful, each process calculates a phase value for the key exchange, attaches a signature to this phase value and sends it to the other process. Each process generates the common key by using the received phase value and the authenticated random number generated by each process itself.

According to this method, even in the case where there is a malicious program intervening between the two processes, it is possible to prevent attacks from such a malicious program.

In order to realize the method for sharing the encrypted data region among three or more processes on a processor having a program and data encryption/decryption function, the execution mode of the processor is shifted to the encrypted instruction execution mode first. Then, the first process among the three or more processes generates a shared encrypted data region to be shared among all these processes. In addition, the first process specifies a common key for the generated shared encrypted data region. Then, an encrypted key notification region to be shared only between the first process and the other arbitrary one process is generated for each one of the other processes. The common key is notified to the other process through the encrypted key notification region shared between two processes. Then, each one of the other processes maps the shared encrypted data region generated by the first process to its own process space. Finally, an address of the shared encrypted data region mapped by each process is registered in the corresponding encrypted attribute register within the processor in relation to the notified common key.

The generation of the encrypted key notification region to be shared between the first process and the other arbitrary one process can be realized by utilizing the sharing method between the two processes described above.

In this way, the key notification region shared between two processes functions as a safe communication path between these processes, and the common key for the shared encrypted data region to be shared eventually by all the processes can be notified to each process through the safe communication path, so that it is possible to share one encrypted data region safely even among three or more processes.

Now, an architecture of the microprocessor presupposed in the present invention will be described. The microprocessor to which the present invention is to be applied has an architecture capable of handling the execution programs and data in both plaintext form and encrypted form, and it is assumed to be the tamper resistant processor in which the execution codes of the encrypted programs and the processing target encrypted data can be utilized only by proper execution processes. From a viewpoint of the security, it is possible to consider the use of a dedicated microprocessor in which the execution of plaintext programs is not allowed, but the use of such a dedicated microprocessor is not preferable because it has a poor portability and it eliminates a possibility for introducing a program for creating/debugging programs before the encryption or a program for decryption.

FIG. 1 shows a basic configuration of the microprocessor to which the present invention is to be applied. This microprocessor 1 has an instruction TLB (Table Look-up Buffer) 2, a processor core 3, an exception processing unit 8, a data TLB 9, and a secondary cache 10. The processor core 3 has an instruction execution unit 4, a primary cache 5, a code and data encryption/decryption unit 6, and a bus interface unit 7. The code and data encryption/decryption unit 6 has an encrypted attribute register 20.

This microprocessor 1 differs significantly from the ordinary processor in that the code and data encryption/decryption unit 6 is provided inside the processor core 3. The encrypted execution codes and data will flow through the bus in the encrypted state. The execution codes and data entered into the processor core 3 are decrypted by the code and data encryption/decryption unit 6 before being fetched into the primary cache 5. When these execution codes and data are to be outputted to the bus again, they are outputted in the encrypted state.

The instruction execution unit 4 has a register set (not shown), and the plaintext data are processed inside the register. In the case of the OS supporting the multi-task, attacks for eavesdropping the register information by forcefully causing the context switching by a faked OS or the like can be considered. However, by adopting the scheme disclosed in the commonly assigned co-pending U.S. patent application Ser. No. 09/781,284, it is possible to prevent such attacks as the encryption/decryption function is automatically activated at times of saving and recovering the context.

Inside the code and data encryption/decryption unit 6, a secret key specific to the processor according to the public key cryptosystem is maintained in such a manner that it cannot be read out by any privileged program. This secret key is used inside the processor automatically at a time of decrypting the program or data encrypted by using the corresponding public key.

By adopting the microprocessor architecture of FIG. 1, it is possible to protect programs from the analysis and the alteration by malicious users or programmers, because the codes and data of the encrypted programs cannot be decrypted and utilized by anything other than the proper processor which knows the specific key.

The codes and data to be protected are in the encrypted form while they are existing on an external memory device or memory, and decrypted only while they are read into the primary cache and the registers inside the processor. When there is a need to write them back from the cache to the memory, the encryption processing is automatically applied inside the processor as already mentioned above. In this way, the decrypted (plaintext) form of the encrypted instruction codes and data is confined inside the processor so as to prevent a disclosure of the plaintext data on the registers at a time of the context switching.

Figure 2:
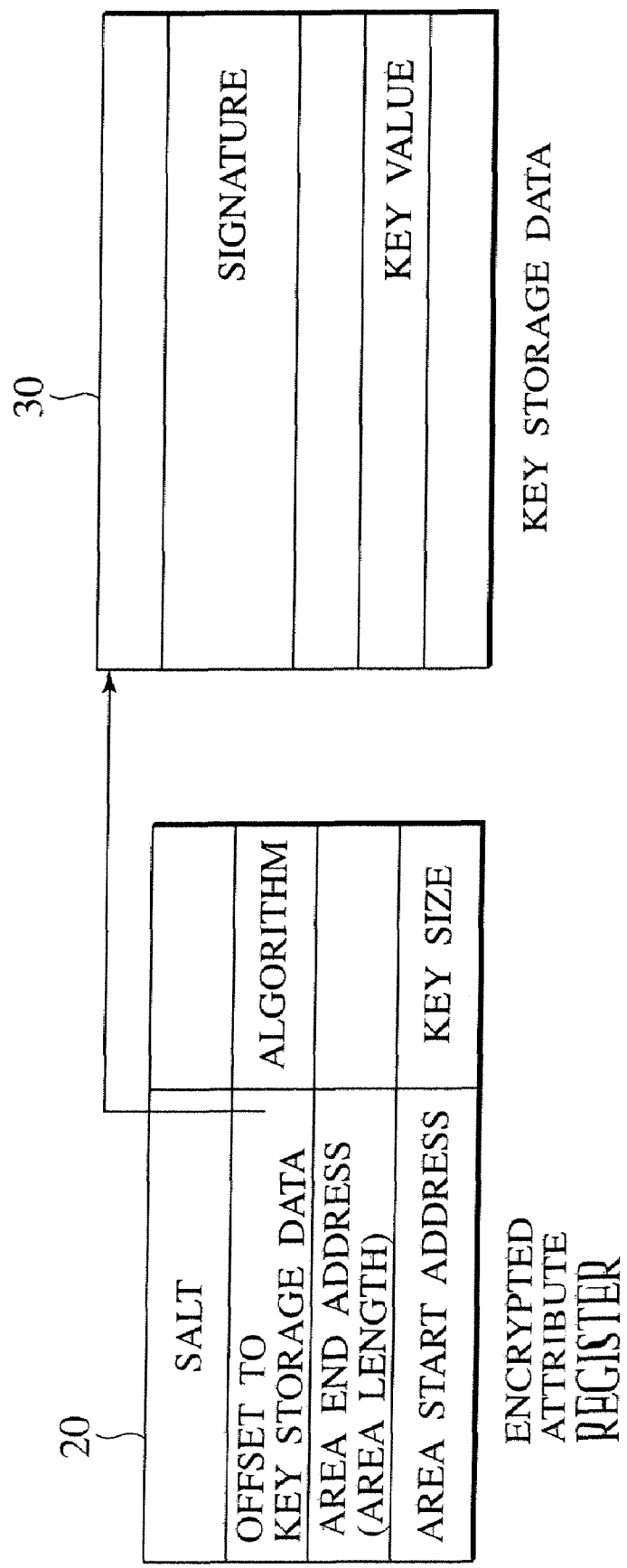
FIG. 2 is an exemplary configuration of an encrypted attribute register and a key storage data inside the microprocessor of FIG. 1.

FIG. 2 shows an exemplary configuration of the encrypted attribute register 20. The encrypted attribute register 20 comprises a plurality of hidden registers for storing a key corresponding to each program or data to be decrypted (encrypted) separately inside the processor, in such a manner that any privileged program cannot read the encrypted attribute register 20 and the microprocessor 1 can utilize the encrypted attribute register 20 only during the execution of the proper program.

The encrypted attribute register 20 registers information such as a start address and an end address (or a region size) of the encrypted region, an applied encryption algorithm, an offset to a key storage data 30, a key size, etc. The key storage data 30 contains a key value and a signature.

When the microprocessor 1 executes the encrypted execution code, the execution mode is shifted to a mode called encrypted instruction execution mode. In the encrypted instruction execution mode, the microprocessor 1 automatically decrypts the encrypted execution code by utilizing the decryption key registered in the corresponding encrypted attribute register 20 and carries out the instruction execution. At this point, data to be piled up in the stack and data to be written into the other data regions are also automatically encrypted and then automatically decrypted at a time of reading. Data in the decrypted plaintext state exist only on the register and the primary cache lines of the instruction execution unit 4, and data are put in the encrypted state again when data are to be outputted to an external memory through the bus.

An access to the encrypted data is normally made in the encrypted instruction execution mode, but it is also possible to make an access to the encrypted data from the plaintext instruction execution mode (normal instruction execution mode) and automatically carry out read/write of data in the encrypted form on an external memory. However, in general, an access to data that should be encrypted should preferably be made after shifting to the encrypted instruction execution mode for the purpose of making the analysis difficult by preventing a tracing of the instruction execution sequence by the processor.

At a time of carrying out the context switching, the context (the register information, etc.) of the executed process is saved in an external memory, and within this context, the encrypted attribute register information, etc., that should be hidden from the other processes are saved on the memory after the microprocessor 1 carried out the encryption processing.

Alternatively, it is also possible to use a configuration in which the encrypted attribute register 20 is accompanied by an execution target process ID and the information of the encrypted attribute register 20 is maintained inside the microprocessor 1 even after the context switching. In this case, the context switching processing is carried out in a form which guarantees that it is not available to the processor except at a time of the execution of this process (i.e., not available at a time of the execution of an other process).

The microprocessor with the above described features will be referred to as the tamper resistant processor in the present invention.

Next, the program execution operation on the tamper resistant processor presupposed by the present invention will be described.

First, the procedure for executing the protected program on a computer having the microprocessor (tamper resistant processor) 1 inside will be described. It is assumed that the protection target program is already installed in this computer prior to the program execution. It is also assumed that the key necessary for the processor 1 to decrypt the encrypted execution code is encrypted by using the public key corresponding to the secret key specific to the processor by a creator, a provider or the like of the program and downloaded and installed in the computer in advance via the Internet or by means of the distribution medium. There can also be cases where the decryption key necessary for the program execution is encrypted by using the public key corresponding to the processor owned by the user by a creator, a provider or the like of the program and embedded inside the protection target program.

At a time of decrypting the encrypted execution code, the microprocessor 1 utilizes this key. For this reason, there is a need to set this execution code decryption key in the plaintext state into the encrypted attribute register 20 inside the processor at an early stage of the protected program execution and before entering the encrypted execution code section. The decryption key is encrypted by using the public key specific to the processor, but it can be decrypted by using the secret key of the processor inside the processor and safely set in the plaintext state into the encrypted attribute register 20 by issuing the following instruction.

setck decryption key data encrypted by using the public key of the processor

The above example shows an exemplary instruction targeting at a system capable of setting only one decryption key with respect to the currently executed process. Namely, in this system, the same decryption key will be shared even when a plurality of plaintext execution codes and encrypted execution codes coexist inside the program.

There can be cases where the program is constructed by combining plural types of execution codes (object codes) created separately by a plurality of creators. In recent years, it has become popular to carry out the programming in this form, and in such cases, there is a need to provide a system which is capable of handling the state in which various types of execution codes are encrypted by different encryption keys. Namely, there is a need to separately provide the decryption keys necessary for decrypting and executing the program that is created by applying different encryption processings to different execution code regions.

In this case, the instruction for setting the execution code decryption key into the encrypted attribute register 20 becomes as follows.

setk segment ID decryption key encrypted by using the public key of the processor (1)

Here, the information of the encrypted region is specified by using a region ID given in a form of the segment ID.

The segment ID is an ID by which the microprocessor 1 identifies a region, which corresponds to an identifier of a segment information storing a top address of the region or a combination of a top address and a region size (or an end address) of the region.

In general, the program is constructed by linking various execution codes (object codes) including libraries. The execution code (object code) contains an instruction section, a data section, and a link information section (which may also contain a debugging information at a time of debugging), and the encryption using the same key or the encryption using different keys can be applied with respect to these sections.

At a time of executing the program, a stack region and a dynamically allocated data region are set up by the assistance of the OS, the program loader and the dynamic linker, so as to put the program in an execution possible state.

In order to start the program execution, the program is loaded (mapped) onto the memory by the program loader (and the OS) first, and initial setting of the execution codes and regions for stack and data is made. At a time of using a dynamic library, the preliminary processing is carried out such that the dynamic linker and the dynamic library will be called up appropriately at a time of the execution.

In the case of specifying the encryption/decryption with respect to the execution codes and regions for stack and data, the key corresponding to each region is specified and set in the plaintext state into the encrypted attribute register 20 inside the microprocessor 1 in advance, as described above.

The encryption related information of the region (size, mapping target, attribute, etc. of each region) may be embedded inside the program by a creator, a provider or the like of the program, or may be downloaded into the computer separately from the program. In the case where the encryption related information is embedded inside the program, the storing position depends on the execution binary format.

The key corresponding to each region is set into the encrypted attribute register 20 by using the instruction (1), and this setting is carried out at a time of the program loading and the mapping to the address space by the program loader (and the OS).

In the case of newly creating an encryption target data region dynamically, the setting into the encrypted attribute register 20 by using the instruction (1) is carried out at that point. This operation will be described in further detail in relation to the inter-process sharing of the encrypted data region to be described below.

Figure 3:
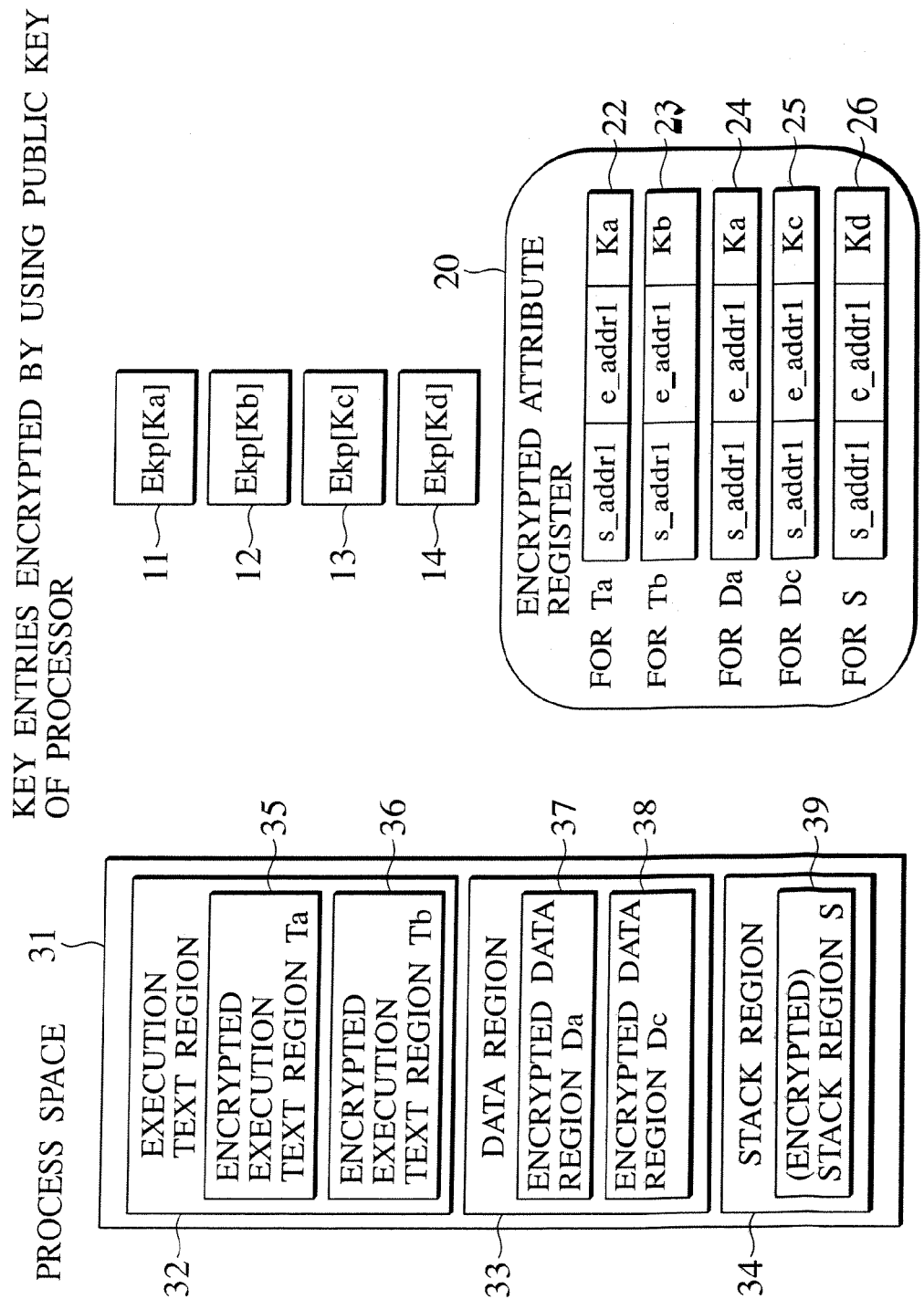
FIG. 3 is a diagram showing an exemplary relationship among encrypted regions generated in a process, keys used in generating these regions, and an encrypted attribute register in the microprocessor of FIG. 1.

FIG. 3 shows an exemplary key setting in the encrypted attribute register 20 at a time of executing the program in which plural types of execution codes are combined. In FIG. 3, there are key entries 11 to 14 for keys (Ekp[Kx]) of the execution codes (object codes), each of which is encrypted by using the public key Kp specific to the processor, and the execution code regions of the program that are encrypted by using these keys Kx are arranged in the process space 31. The encrypted attribute register 20 stores the start address, the end address and the key of the corresponding region in the plaintext state. The configuration of the encrypted attribute register 20 is simplified here for the sake of explanation.

In the example of FIG. 3, the program is constructed from:

an execution text region Ta and a data region Da which are encrypted by using the key Ka;

an execution text region Tb which is encrypted by using the key Kb;

a data region Dc which is encrypted by using the key Kc; and an (encrypted) stack region S for storing data which is encrypted by using the key Kd under the encrypted instruction execution mode.

Here, the key entries 11 to 14 encrypted by using the public key of the processor are supplied from an external of the program. By using the instruction (1), the keys Ka, Kb, Kc and Kd are decrypted from the key entries 11 to 14 and the region information, the key information, etc. are registered into entries 22 to 26 of the encrypted attribute register 20 in correspondence to the respective encrypted regions arranged in the process space, inside the microprocessor 1.

Next, the processing for shifting from the plaintext instruction execution mode to the encrypted instruction execution mode will be described. There are two methods for realizing this shifting processing, including an explicit shifting processing instruction describing method and an automatic shifting processing method.

(1) Explicit Shifting Processing Instruction Describing Method:

First, as the instructions are sequentially executed from the top of the program, there is a case where an instruction for shifting the execution mode of the processor to the encrypted instruction execution mode is explicitly described within codes immediately before the protection target execution code. When the microprocessor 1 executes this shifting instruction, the subsequent execution codes are regarded as the encrypted execution codes so that these execution codes are decoded and executed by decrypting them.

An example of the instruction for shifting to the encrypted instruction execution mode is as follows.

mode shifting instruction: cryptomode (target address to jump)

Similarly, an instruction for returning to the ordinary plaintext instruction execution mode from the encrypted instruction execution mode is as follows.

mode releasing instruction: retmode (target address to return)

The jumping target address and the returning target address can be omitted, and when they are omitted, the mode shifting processing is carried out immediately before the instruction next to the mode shifting instruction or the mode releasing instruction.

During a period since the instruction for shifting to the encrypted mode is issued until the mode releasing instruction is issued, the microprocessor 1 continues the decryption and the execution by regarding the execution code indicated by the program counter as an encrypted one.

In this method, once the processing enters the encrypted instruction execution mode and when there is a jump/call to a function within the execution code encrypted by the other encryption key in the course of the processing, there is a need to describe the similar instruction for shifting to the encrypted instruction execution mode at the calling target as well.

In addition, in the case of returning from the calling target, there is also a need to describe the mode releasing instruction, but the shifting to the execution mode of the calling source cannot be carried out automatically in this way. For this reason, at a time of shifting to another encrypted instruction execution mode (or the plaintext instruction execution mode) after entering one encrypted instruction execution mode (i.e., at a time of calling), the ID of the original encrypted attribute register 20 of the calling source is added to the stack in addition to the returning address. Else, it is maintained inside the processor as a back link information and a flag is set up such that the original instruction execution mode is recovered according to this information at a time of returning.

In this method, there is also a need to automatically insert the above described instruction execution mode shifting instruction immediately before/immediately after the region specified as the encrypted region within the execution program so as to properly manage the mode shifting, by using the program development tools (containing compiler, linker, and encryption tool) or the like.

In this method, it is possible to specify the granularity of the encrypted region rather minutely by inserting the explicit mode shifting instruction at arbitrary position, but the position for shifting to the encrypted instruction execution mode is explicitly described in the program so that it is equivalent to teaching the attacking target code position to the hackers or the like. It may be effective in the case where the mode shifting is to be carried out only at portions that really need to be encrypted and the high speed program execution in the plaintext execution mode is to be expected as much as possible at the other portions, but there is a drawback that the strength against the analysis is going to be lowered. Note that, in this case, there is no need to set up the encrypted attribute register for the encrypted region in advance.

(2) Automatic Shifting Processing Method According to the Encrypted Attribute at a Time of the Region Access:

On the other hand, there is also a method in which the encrypted attribute register is set up in advance at a time of mapping the encrypted region to the memory and the shifting of the execution mode is automatically judged at a time of the execution in the encryption target code region or the reading/writing with respect to the encryption target data region or the stack region, and the shifting of the execution mode is carried out whenever necessary, without using the explicit mode shifting instruction described above.

In this case, the information on a region in which the execution code is encrypted is to be stored into the encrypted attribute register 20 within the processor in advance by using the instruction (1).

There are no explicit mode shifting instruction or mode releasing instruction, and the mode shifting is carried out automatically when the execution enters the specified region or the execution proceeds to the execution code section other than the specified regions. In the case where the execution code to which the execution is to be proceeded from the currently executed encrypted execution code is in a region encrypted by using the other encryption key, the mode shifting corresponding to the proceeding target encrypted execution code is automatically carried out. The similar judgement and execution are also carried out with respect to the encryption target data region and the stack region.

Presupposing the tamper resistant processor (microprocessor 1) having the above described configuration, embodiments of the method for sharing encrypted data region among processes according to the present invention will now be described in detail.

First Embodiment

In the first embodiment, the method for sharing the encrypted data region that is available only between two processes will be described.

Here, data to be read/write with respect to the shared data region to be generated here is encrypted/decrypted by a hardware inside the microprocessor and hidden from the other processes which do not know the key.

In order to share some encrypted data region between different processes, there is a need for a function for sharing the encryption/decryption key to be used with respect to that data region between the two processes, in addition to the function for sharing the memory supported by the ordinary OS. There are two methods for realizing this.

The first method is the simplest method in which the programs for the inter-process sharing are put in a state of knowing the key for the encrypted data region to be shared in advance or a state capable of sharing the key for the encrypted data region to be shared.

The second method is a method for safely notifying the key information to a proper process that requests the sharing of the encrypted data, in the case where the key cannot be shared in advance.

In the first method, i.e., the method for sharing the key in advance, the encrypted data is shared among a plurality of processes as far as the same program is concerned so that the encryption/decryption key for the encrypted data region can be set up to be identical in advance. The key set up method can be (i) a method for directly storing the key in the encrypted data region within the execution code, or (ii) a method for determining the key uniquely by utilizing the initial value and the algorithm such that the same key can always be generated, and setting the key in the encrypted attribute register corresponding to the encrypted data region.

The setting of the key in the encrypted attribute register can be realized by the instruction (1) described above. In the instruction (1), the key to be specified in the encrypted attribute register is encrypted by using the public key specific to the processor, but in the case of setting the common key between processes, the instruction execution code and the decryption key themselves are already encrypted, so that it is also possible to set the decryption key directly by the following instruction.

setik segment ID decryption key (2)

Thereafter, it suffices to carry out the encrypted data region allocation and attaching from the other process by utilizing the memory sharing function provided by the OS. The other process that requests the memory sharing already knows the key corresponding to the target encrypted data region, so that once the access right with respect to the region can be obtained, the memory access with respect to this encrypted data region becomes possible similarly as the creating source process (owner process) of the encrypted data region.

In the second method, i.e., in the case where the key information for the encrypted data region cannot be shared in advance at a time of creating programs, there is a need for a process (owner process) that created the encrypted data region to determine the key information to be used for the encryption/decryption and safely notify the key information to the other proper process (client process) that requests the data sharing.

In this case, there is a need for the owner process that generates the region to determine (the initial value of) the key for the encrypted data region first.

For this key initial value determination, the initial value of the key directly stored in the encrypted data region within the execution code can be utilized, or the same initial value of the key can be used every occasion by determining the key uniquely by utilizing the initial value and the algorithm such that the same key can always be generated, similarly as in the case of the first method described above, but besides these, it is also possible to generate the initial value of the key dynamically by setting the initial value by calling up a random number generation routine (software) or a random number generator (hardware). In this case, by generating/using the different keys at different occasions of the program execution, the strength against the analysis can be improved. This key initial value determination sequence should preferably be carried out in the encrypted instruction execution mode.

Figure 4:
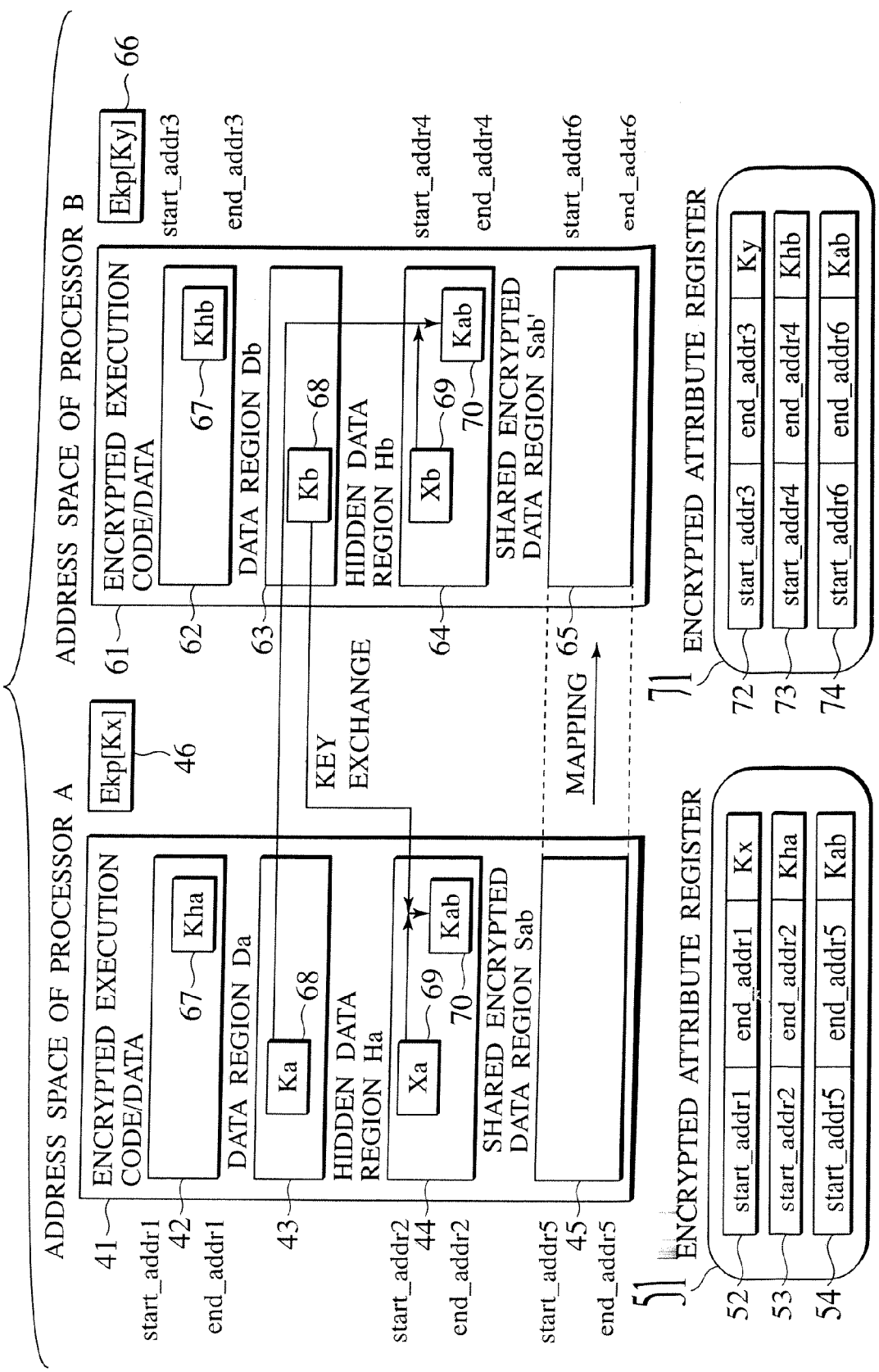
FIG. 4 is a diagram showing an outline of the method for sharing an encrypted data region between two processes and corresponding encrypted attribute registers according to the first embodiment of the present invention.
Figure 5:
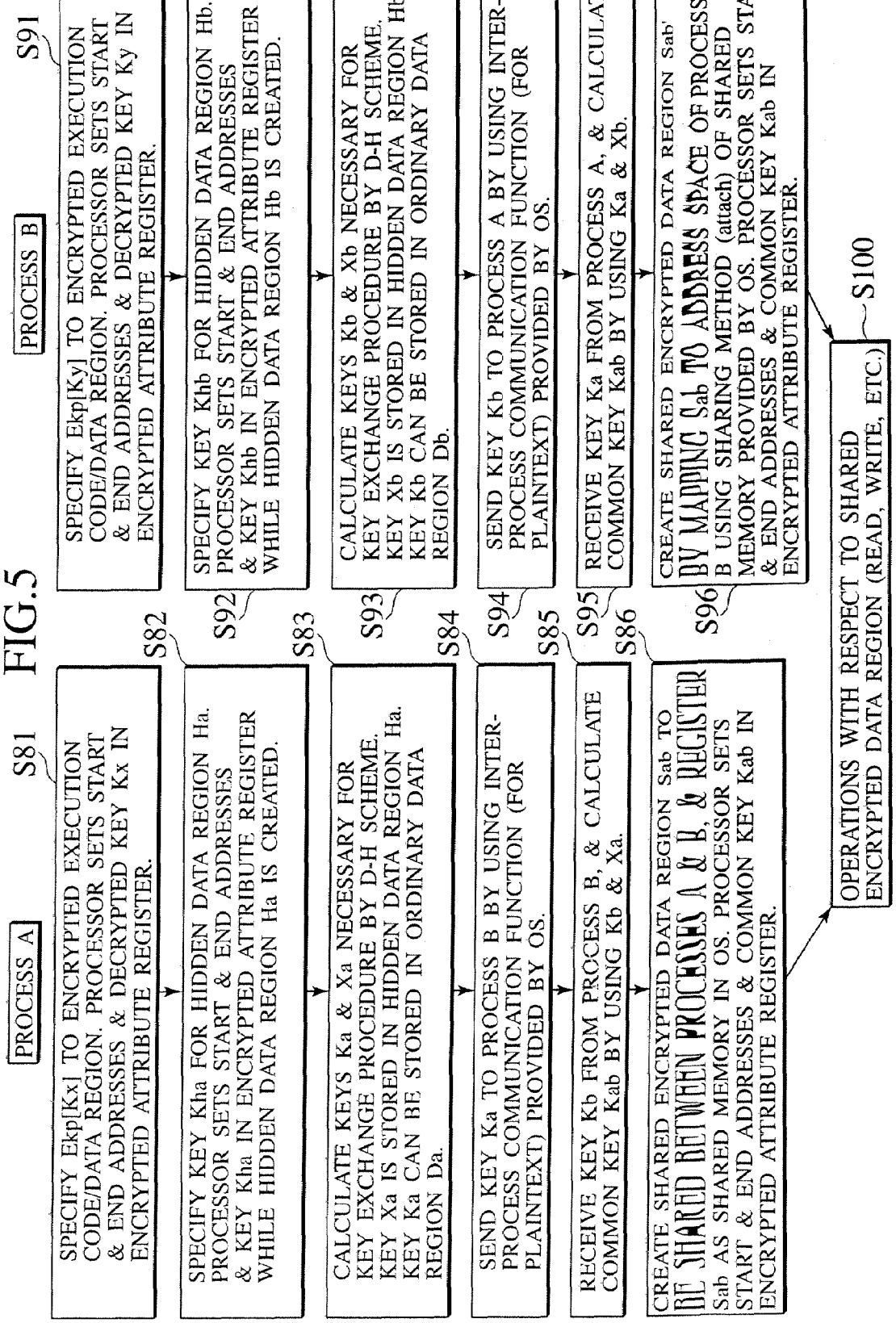
FIG. 5 is a flow chart showing a processing procedure of the method for sharing an encrypted data region between two processes according to the first embodiment of the present invention.

When the owner process determines the initial value of the key, the key for the encrypted data region that is available only between two processes is obtained by carrying out the key exchange with the other process that requests the sharing of the encrypted data region, FIG. 4 and FIG. 5 show the processing procedure in the case of sharing the encrypted data region by generating the common key at each occasion. In the example shown in FIG. 4 and FIG. 5, the Diffie-Hellman (D-H) key exchange sequence is utilized. In the D-H scheme, it is possible to generate the key that is available only between two parties by utilizing the feature that Kab=(_aXa)Xb=KaXb=KbXa cannot be calculated from f(ka, kb). Here, Kab denotes the common key, which is calculated from the values of Ka and Kb by the exponential calculation using the keys Xa and Xb for the key exchange as exponents.

In FIG. 4 and FIG. 5, the owner process A and the client process B are currently executed. The owner process A is a process that generates the shared encrypted data region Sab to be shared between processes, and the client process B is a process that requests the sharing of the shared encrypted data region Sab.

First, the owner process A generates an encrypted execution code/data region 42 in an execution process space (or address space) and specifies a key Ekp[Kx] that is stored in an encrypted state in an external memory, for example, so as to make a shift to the encrypted instruction execution mode (step S81). The key Kx is decrypted by using the secret key Kp specific to the microprocessor 1, and the decrypted key Kx is set in relation to the start address and the end address of the encrypted execution code/data region 42 in the encrypted attribute register 52.

The owner process A also independently allocates a hidden data region Ha for the encrypted data to be hidden from other processes to its own process space, and specifies a key Kha for the hidden data region with respect to this hidden data region Ha (step S82). In the case where the key Kha for the hidden data region is embedded in the encrypted program in advance, this key will be used, but it is also possible to generate an initial value by a random number generator and produce the key Kha dynamically. In the case where the key Kha is produced dynamically, the key Kha is maintained in the encrypted execution code/data region 42 of the owner process A. The start address and the end address of the hidden data region Ha is set in relation to the key Kha for this region in the encrypted attribute register 53.

Next, the owner process A calculates the keys Ka and Xa necessary for the key exchange according to the D-H scheme (step S83). More specifically, information (_a and q) necessary in calculating the key Ka of the process A is generated first. Arbitrary method such as that using a random number generation is determined in advance as a method for generating these values. In addition, another key Xa necessary for the key exchange is determined and this key is stored in the hidden data region Ha 44. Using these, the key Ka (=_aXa mod q) of the owner process A is calculated, and this key Ka is stored in an ordinary non-encrypted data region Da 43. All the data used in the course of this calculation are placed in the encrypted stack region (not shown) or the hidden data region Ha.

The key Ka of the process A is handled similarly as the public key and exchanged in a plaintext form through bus and memory beyond the process space. On the other hand, the key Xa for the key exchange is handled similarly as the secret key and placed in the encrypted hidden data region Ha.

The above described steps are also carried out at the client process B. Namely, the process B specifies an encrypted execution code/data region 62 in the corresponding process space (step S91), and independently generates a hidden data region Hb 64 and specifies a key Khb for the hidden data region Hb 64 (step S92). The addresses and the corresponding key for these regions are set in corresponding entries 72 and 73 in the encrypted attribute register 71. In addition, the keys Kb and Xb necessary for the key exchange with the process A are calculated according to the D-H scheme (step S93). The key Kb is placed in an ordinary data region Db 63 in a plaintext state, while the key Xb is placed in the hidden data region Hb 64.

Next, the owner process A transmits the key Ka to the process B (step S84). The key Ka is handled similarly as the public key, so that it can be transmitted by utilizing arbitrary inter-process communication function such as API provided by the library or the OS. On the other hand, the client process B also transmits the key Kb to the process A by utilizing the similar inter-process communication function (step S94).

The owner process A calculates the common key Kab (=KbXa) by using the key Kb received from the process B and its own key Xa, and stores this common key in the hidden data region Ha (step S85).

Similarly, the client process B calculates the common key Kab (=KaXb) by using the key Ka received from the process A and its own key Xb, and stores this common key in the hidden data region Hb (step S95).

Next, the owner process A generates the shared encrypted data region Sab for which accesses are permitted only from the processes A and B (step S86). The shared encrypted data region Sab is created by utilizing a memory allocation function provided by the library or the OS. The start address and the end address of the shared encrypted data region Sab are set in relation to the common key Kab stored at the process A in the encrypted attribute register 54.

The client process B maps the shared encrypted data region Sab created by the owner process A to its own process space by utilizing the memory sharing function provided by the OS (step S96). There is no need to encrypt the memory sharing information to be exchanged here. For the shared encrypted data region Sab' mapped to the process space of the process B, the start address and the end address are set in relation to the common key Kab stored at the process B in the encrypted attribute register 74.

After reaching this state, the processes A and B can freely carry out read/write with respect to the shared encrypted data region Sab (or Sab') (step S100). Accesses to the shared encrypted data region are made through the encrypted attribute register of the microprocessor (tamper resistant processor) 1, so that only the processes A and B that know the common key can make accesses. Any other processes which do not know the common key cannot make accesses, so that the sharing of the encrypted data region only between two processes can be realized safely.

Also, when each process carries out read/write of data with respect to the shared encrypted data region, the encryption/decryption of data is automatically carried out between the primary cache and the external memory by referring to the information of the encrypted attribute register inside the processor core. In this way, the secret of the processing data for the encrypted program can also be protected.

Second Embodiment

In the first embodiment, the shared encrypted data region is realized by carrying out the key exchange between two processes and registering the common key in the respective encrypted attribute registers. The second embodiment provides the method for sharing the encrypted data region more safely by carrying out the authentication in the key exchange.

In the method of the first embodiment, when there is a malicious program such as altered OS intervening between two processes that carry out the key exchange, there is a possibility for an attack called "man in the middle attack". Namely, there is a possibility for the intervening program to forge the information necessary for the key generation and freely eavesdrop or alter the encrypted data by manipulating the keys arbitrarily.

If it is a system for which there is no way of having a malicious altered program inserted into the system, the application of the key exchange scheme of the first embodiment will cause no problem, but if it is a system to which a program can be freely added such as a general purpose OS on the PC, there is a possibility of receiving the attack.

In order to protect the key exchange sequence from such an attack, it is possible to use a scheme in which a certificate for certifying that information such as the public key to be used by the program is authenticated/issued through a public organization or the like is provided and it is guaranteed that the proper exchange cannot be carried out unless the proper public key with the certificate is used.

In the following, the protection method using an electronic signature algorithm which is the public key encryption technique and the D-H key exchange algorithm will be described with reference to FIG. 6. The encryption algorithm to be used in the key exchange sequence can be arbitrary.

While executing this method, it is assumed that the executed process is shifted to the encrypted instruction execution mode, and data to be created/used during the key exchange sequence are to be placed in the hidden data regions Ha and Hb provided within the respective processes.

Figure 6:
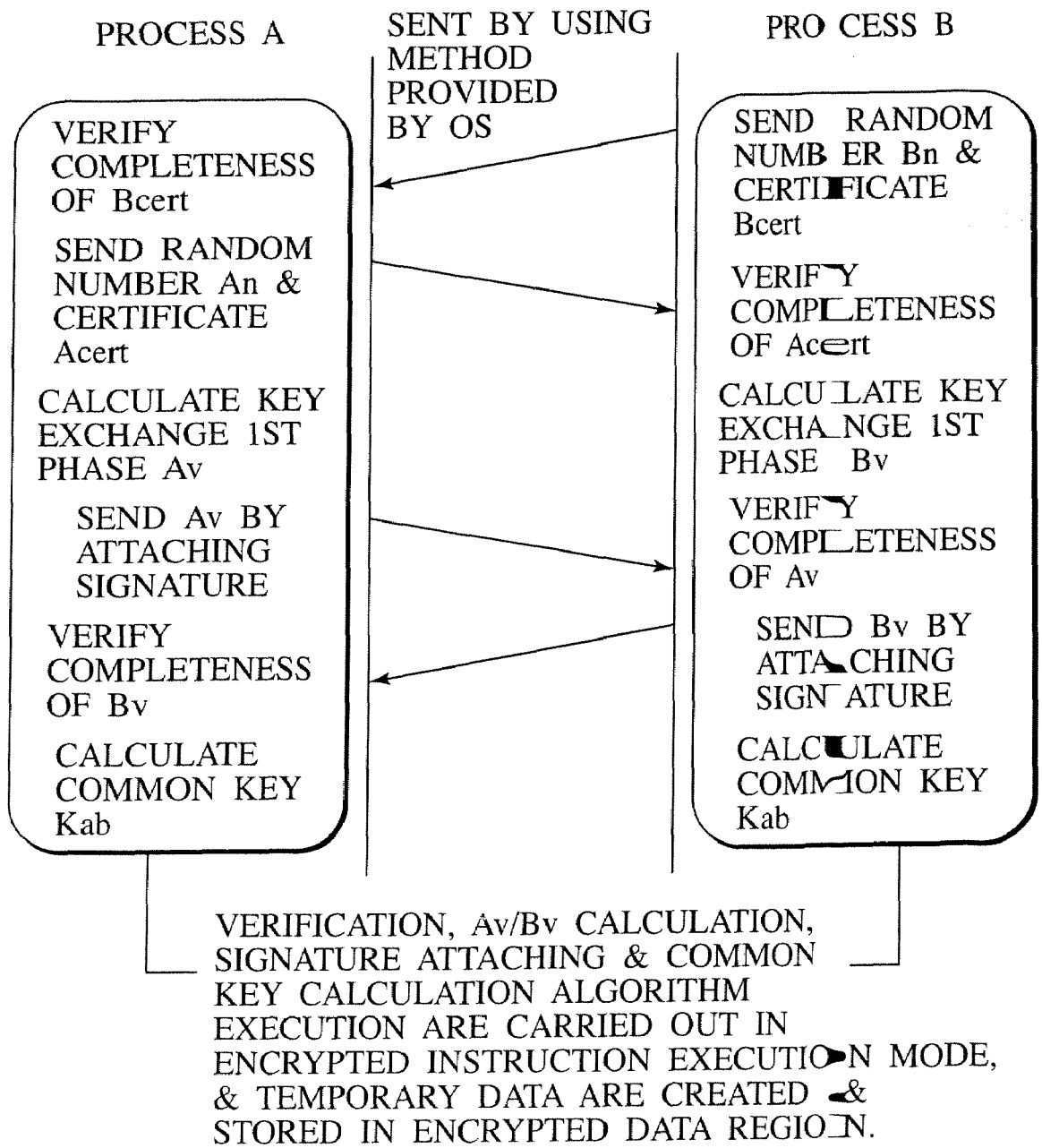
FIG. 6 is a sequence chart showing an authentication procedure used in the method for sharing an encrypted data region between two processes according to the second embodiment of the present invention.

In FIG. 6, the client process B that requests the sharing of the encrypted data region sends a challenge random number Bn generated by a random number generator and a certificate Bcert produced by the public organization, to the owner process A so as to request the authentication.

Here, the certificate Bcert is a certificate produced by the public organization by using a secret key Ksg, in which the public key Kab of the client process B issued by the public organization is embedded, and from which this public key Kab can be extracted by using the public key Kpg of the public organization.

There is no need to encrypt the certificate to be transmitted to the owner process A, and the system call or API provided by the OS or the library can be utilized. Hereafter, the service routine of the ordinary OS or library can be utilized for the transmission and reception of data such as the certificate between processes, unless otherwise specified.

The owner process A carries out the verification of the completeness of the received certificate Bcert by using the public key Kpg of the public organization. When it is judged that the signature by the public organization is proper as a result of the verification, the owner process A calculates a key exchange first phase value Av. At this point, the public key Kpb of the client process B is also obtained.

At the same time, the owner process A sends a challenge random number An and a certificate Acert to the client process B so as to request the authentication. The client process B verifies the completeness of the received certificate Acert, and when it is judged that the signature by the public organization is proper, a key exchange first phase value By is calculated. At this point, the public key Kpa of the owner process A is also obtained.

The owner process A produces a message signature for the key exchange first phase value Av and the challenge random number Bn of the process B, and sends it to the client process B.

The client process B similarly produces a message signature for the key exchange first phase value Bv and the challenge random number An of the process A, and sends it to the owner process A.

The owner process A checks the message signature received from the client process B by using the public key Kpb of the client process B, and verifies that this message signature is not changed.

The owner process A calculates the authenticated common key Kab (or Kauth) between the processes A and B by using a random number and the verified phase value Bv.

The client process B similarly checks the message signature received from the owner process A by using the public key Kpa of the owner process A, and verifies that this message signature is not changed.

The client process B calculates the authenticated common key Kab (or Kauth) between the processes A and B by using a random number and the verified phase value Av.

By using such an authentication method, in the case of exchanging the key information on the non-encrypted communication path between two processes, it possible to prevent a situation in which a malicious program (including an altered OS) that is intervening between two processes alters the authenticated key or breaks the key itself.

Next, the owner process A creates the shared encrypted data region Sab to be accessed only from the processes A and B that know the common key Kab (or Kauth), similarly as in the step S86 of FIG. 5 (the first embodiment). The shared encrypted data region Sab is created by utilizing the memory allocation function provided by the library or the OS. The start address, the region size (or the end address), the attribute value, etc. of the shared encrypted data region Sab are placed under the memory resource management of the OS. the common key Kab (or Kauth) is set in relation to the region addresses in the encrypted attribute register.

Next, the client process B maps the shared encrypted data region Sab created by the owner process A to its own process space by utilizing the memory sharing function provided by the OS, similarly as in the step S96 of FIG. 5 (the first embodiment). There is no need to encrypt this memory sharing information to be exchanged here. For the process B, information including the common key Kab (or Kauth) is also set in the encrypted attribute register for the region Sab' of the process B.

Thereafter, accesses to the shared encrypted data region Sab are made by the processes A and B through the encrypted attribute register of the microprocessor (tamper resistant processor) 1, so that only the processes A and B that know the common key Kab (or Kauth) can make accesses safely.

Third Embodiment

The first and second embodiments are directed to the method for sharing the shared encrypted data region between two processes. In the third embodiment, a procedure for constructing a shared encrypted data region Hshare to be shared among three or more processes will be described.

Figure 7:
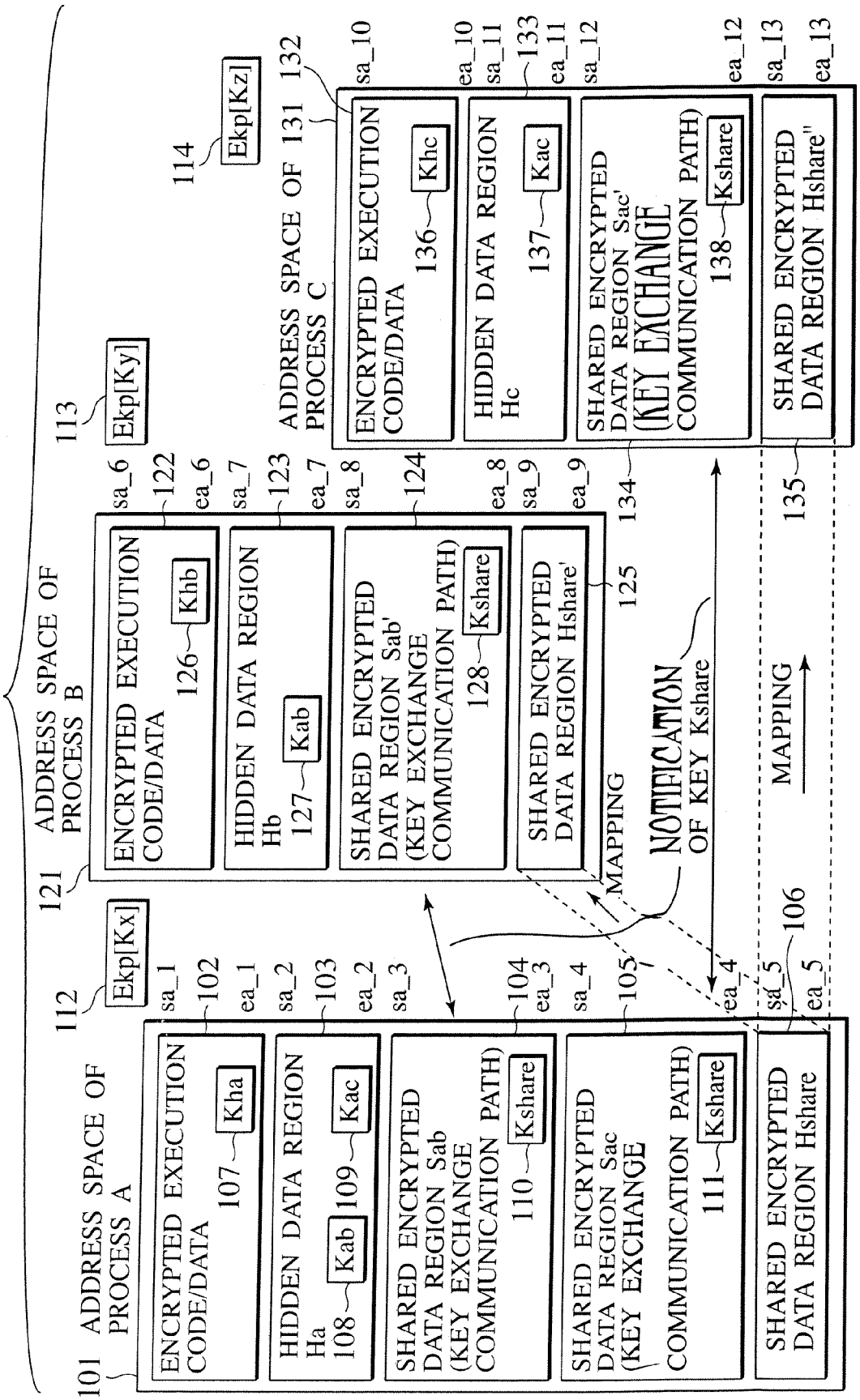
FIG. 7 is a diagram showing an outline of the method for sharing an encrypted data region among three processes according to the third embodiment of the present invention.
Figure 8:
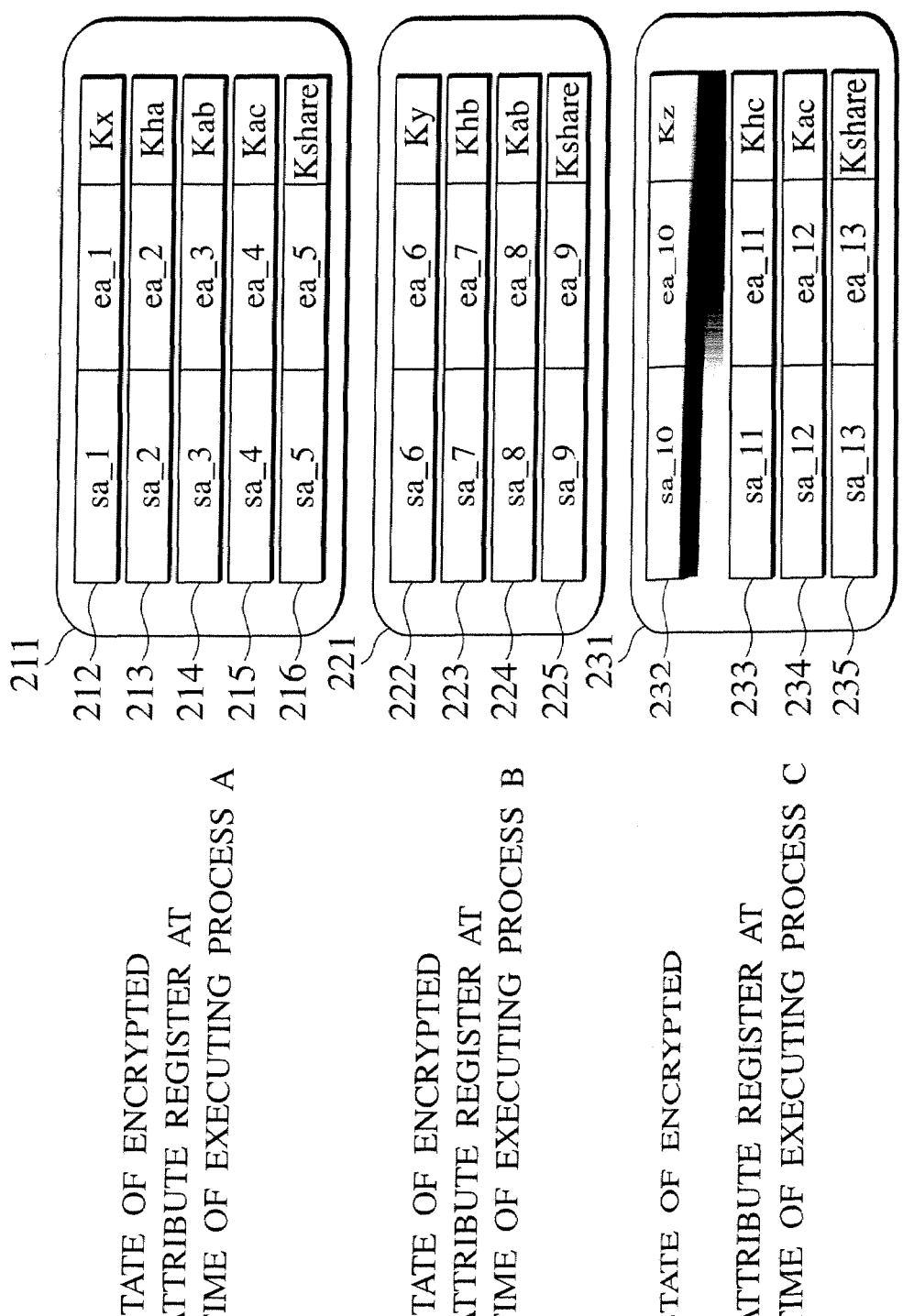
FIG. 8 is a diagram showing exemplary configuration of encrypted attribute registers used in the method for sharing an encrypted data region among three processes according to the third embodiment of the present invention.

FIG. 7 shows respective address spaces of the processes A, B and C, and an exemplary configuration of the shared encrypted data region to be shared by these processes. In the example of FIG. 7, the process A is an owner process which is a creator of the shared encrypted data region Hshare. FIG. 8 shows an exemplary configuration of the encrypted attribute registers of the respective processes for the purpose of creating the shared encrypted data region.

First, the owner process A is shifted to the encrypted instruction execution mode, and creates the shared encrypted data region Hshare 106 in its own address space. A key Kshare for the region Hshare may be embedded in the program code in advance, or an initial value can be generated by using a random number generator or the like and the key can be generated by utilizing this initial value. In the case where the key Kshare is generated dynamically, this key is maintained in the hidden data region. The addresses of the shared encrypted data region Hshare 106 and the key Kshare for this region are set in the encrypted attribute register 216 inside the microprocessor 1.

Next, the owner process A creates the shared encrypted data region Sab 104 to be shared only between the processes A and B in its own address space according to the method of the first embodiment. Similarly, the owner process A also creates the shared encrypted data region Sac to be shared only between the processes A and C. Namely, placing the owner process A at a center, the shared encrypted data region Sax to be shared in a one-to-one fashion with each process with which the encrypted data region Hshare should be shared is created. The addresses of the shared encrypted data regions Sab and Sac of the owner process A in the example of FIG. 7 and the common keys Kab and Kac for making accesses to these regions are set in relation in the encrypted attribute registers 214 and 215 respectively.

The shared encrypted data region Sax to be shared in a one-to-one fashion between the owner process A and each client process will function as a communication path for safely notifying the key Kshare for the eventual shared encrypted data region Hshare among processes. In this sense, the shared encrypted data region Sax between two processes can be referred to as a key notification region. More specifically, the process A writes the key Kshare for the shared encrypted data region Hshare into the shared encrypted data region Sab with respect to the process B. The process B creates the shared encrypted data region Sab' virtually in its own address space, and reads the key Kshare by using regions Sab-Sab' as a secure communication path. In this way, the key Kshare for the region Hshare can be shared between the processes A and B.

The process B also maps the shared encrypted data region Hshare of the owner process A to its own address space by utilizing the memory sharing function provided by the OS similarly as in the case of the ordinary shared memory. In this way, the shared encrypted data region Hshare is virtually created in its own address space. The addresses of the region Sab' and the eventual shared encrypted data region Hshare' of the process B and the keys Kab and Kshare for these regions are set in relation in the encrypted attribute registers 224 and 225 of the process B respectively.

Similarly, in the case where the process C shares the shared encrypted data region Hshare created by the owner process A, the process C can share the region Hshare by reading the key Kshare for the region Hshare written into the region Sac by the owner process A through a secure communication path Sac-Sac', and mapping the region Hshare of the process A to its own address space. The addresses of the key notification region Sac' and the shared encrypted data region Hshare" and the keys Kac and Kshare for these regions are set in relation in the encrypted attribute registers 234 and 235 of the process C respectively.

In the case where any other process shares the shared encrypted data region Hshare, it is possible to establish a secure communication path between the owner process A and that other process and share the shared encrypted data region Hshare by carrying out the sequence similar to those of the process B or C.

Note that the encrypted execution code/data regions 101, 121 and 131 and the hidden data regions Ha 102, Hb 123, and Hc 133 shown in FIG. 7 are generated similarly as in the first embodiment so that their description is omitted here.

In the third embodiment, an exemplary case of sharing one encrypted data region among three processes has been described, but the encrypted data region can be shared among four or more processes by the similar method. In this case, when the number of sharing processes is n, the encrypted data region Hshare can be shared only among these processes by forming n−1 sets of the secure communication paths, i.e., the shared regions Sax, between the owner process and the client processes, and carrying out the notification of the common key Kshare through these secure communication paths.

As described, according to the present invention, each process carries out the key exchange after the execution mode is shifted to the encrypted instruction execution mode, in order to share the encrypted data region between two processes. The common key and temporary data used for the calculation of the common key are placed on the hidden data region that can only be read by each process or the register inside the processor, so that it is possible to realize the safe key sharing which is protected even from the privileges of the OS.

Also, according to the present invention, one process creates the encrypted data region to be shared according to the common key generated as a result of the safe key exchange, and the other process maps that region to its own address space (or process space). The addresses of the shared encrypted data region and the common key of each process are set in relation in the encrypted attribute register inside the microprocessor, so that it is possible to share the encrypted data region safely.

Also, according to the present invention, in the case of sharing one encrypted data region among three or more processes, the shared encrypted data region to be shared between the owner process and the other arbitrary process is utilized as a secure communication path for the purpose of the key notification, so that it is possible to share the eventual shared encrypted data region among three or more proper processes safely.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for sharing an encrypted data region among first and second processes on a tamper resistant processor having a program and a data encryption/decryption function, the method comprising:
   (a) shifting an execution mode of the tamper resistant processor to an encrypted instruction execution mode;
   (b) operating the first process to generate a first hidden region of the first process and the second process to generate a second hidden data region of the second process and to specify a first key for the first hidden data region of the first process in a first process space of the first process and to specify a second key for the second hidden data region of the second process in a second process space of the second process under the encrypted instruction execution mode, the first key being different from the second key;
   (c) operating the first and second processes to generate mutually different key pairs to be used in a key exchange and carrying out the key exchange between the first and second processes;
   (d) operating each of the first and second processes to generate a common key according to the key exchange;
   (e) generating a shared encrypted data region to be shared by the first and second processes which is valid only with respect to the common key; and
   (f) storing the common key and data used in a course of the key exchange in the first hidden data region of the first process and in the second hidden data region of the second process, which are valid only with respect to the first key for the first hidden data region and the second key for the second hidden data region.

2. The method of claim 1, wherein the step (e) operates one process among the first and second processes to generate the shared encrypted data region in the process space of the one process and operates another process among the first and second processes to map the shared encrypted data region generated by the one process to the process space of the another process.

3. The method of claim 2, further comprising:
   storing address information of the first hidden data region in association with the first key and storing address information of the second hidden data region in association with the second key in an encrypted attribute register inside the tamper resistant processor; and
   storing address information of the shared encrypted data region for each of the first and second processes in association with the common key in the encrypted attribute register inside the tamper resistant processor.

4. The method of claim 1, wherein the step (c) operates the first and second processes to carry out the exchange that includes a verification of a message signature, and the step (d) operates each of the first and second processes to generate the common key which is authenticated according to the verification.

5. The method of claim 1, further comprising:
   encrypting/decrypting data to be sent/received to/from an external memory at the tamper resistant processor by referring to information set in an encrypted attribute register inside the tamper resistant processor when each process carries out a write/read operation with respect to the shared encrypted data region.

6. A tamper resistant processor having a program and a data encryption/decryption function and a memory that stores computer readable program codes for sharing encrypted data region among first and second processes, wherein the computer readable program codes include:
   a first computer readable program code for causing said computer to shift an execution mode of the tamper resistant processor to an encrypted instruction execution mode;
   a second computer readable program code for causing said computer to operate the first process to generate a first hidden data region of the first process, and the second process to generate a second hidden data region of the second process, and to specify a first key for the first hidden data region of the first process in a first process space of the first process and to specify a second key for the second hidden data region of the second process in a second process space of the second process under the encrypted instruction execution mode, the first key being different from the second key;
   a third computer readable program code for causing said computer to operate the first and second processes to generate mutually different key pairs to be used in a key exchange and to carry out the key exchange between the first and second processes;

a fourth computer readable program code for causing said computer to operate the first and second processes to generate a common key according to the key exchange;

a fifth computer readable program code for causing said computer to generate a shared encrypted data region to be shared by the first and second processes which is valid only with respect to the common key; and a sixth computer readable program code for causing said computer to store the common key and data used in a course of the key exchange in the first hidden data region of the first process and in the second hidden data region of the second process, which are valid only with respect to the first key for the first hidden data region and the second key for the second hidden data region.

7. The tamper resistant processor of claim 6, wherein the fifth computer readable program code operates one process among the first and second processes to generate the shared encrypted data region in the process space of the one process and operates another process among the first and second processes to map the shared encrypted data region generated by the one process to the process space of the another process.

8. The tamper resistant processor of claim 7, wherein the computer readable program codes further include:

a seventh computer readable program code for causing said computer to store address information of the first hidden data region in association with the first key and to store address information of the second hidden data region in association with the second key in an encrypted attribute register inside the tamper resistant processor, and to store address information of the shared encrypted data region for each of the first and second processes in association with the common key in an encrypted attribute register inside the tamper resistant processor.

9. The tamper resistant processor of claim 6, wherein the third computer readable program code operates the first and second processes to carry out the exchange that includes a verification of a message signature, and the fourth computer readable program code operates each of the first and second processes to generate the common key which is authenticated according to the verification.

10. The tamper resistant processor of claim 6, wherein the computer readable program codes further include:

a seventh computer readable program code for causing said computer to encrypt/decrypt data to be sent/received to/from an external memory at the tamper resistant processor by referring to information set in an encrypted attribute register inside the tamper resistant processor when each process carries out a write/read operation with respect to the shared encrypted data region.

* * * * *